March 18, 1947.  T. L. GOTTIER  2,417,549
FIRE CONTROL COMPUTER
Filed Jan. 29, 1944
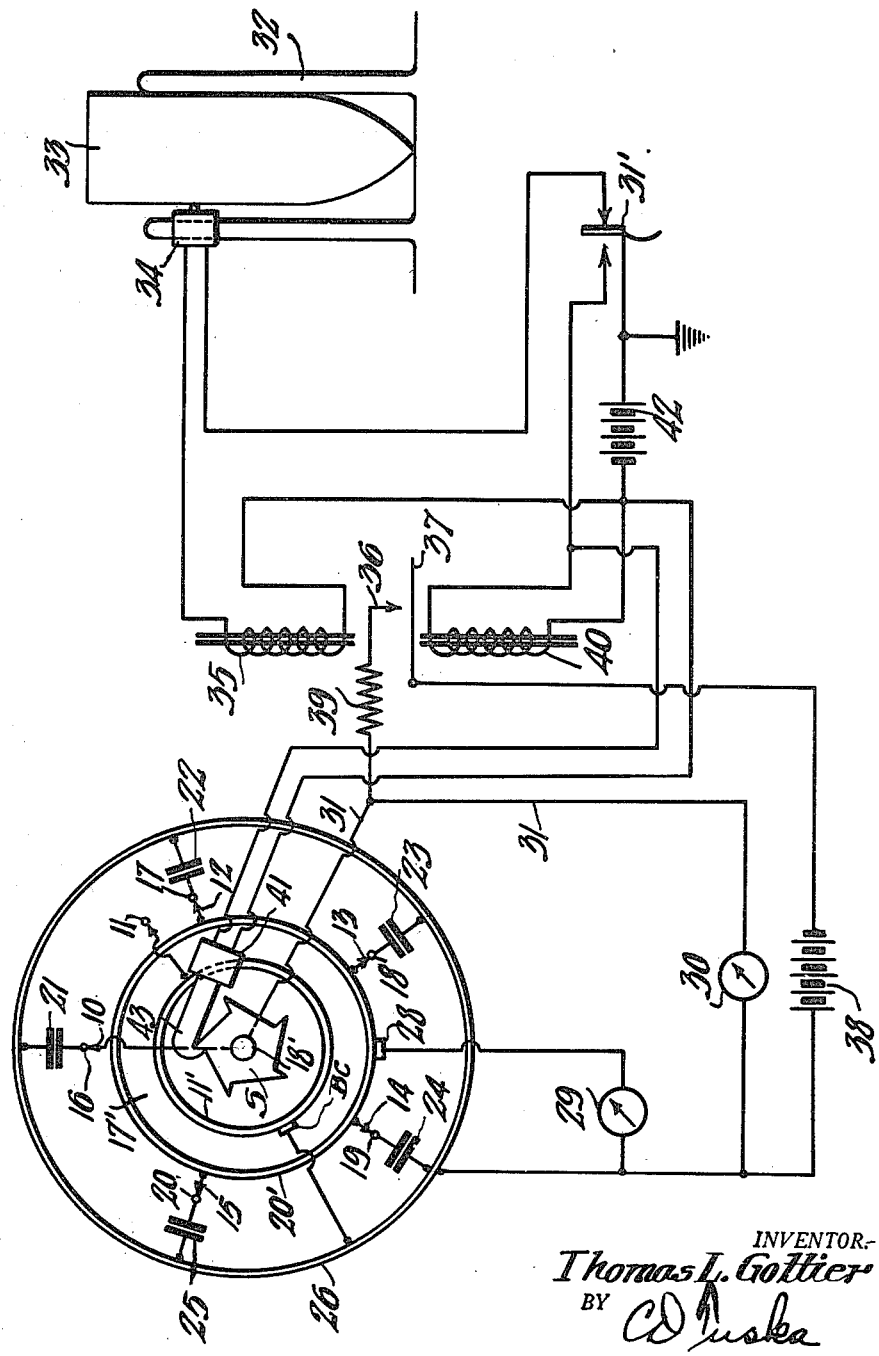
INVENTOR:
Thomas L. Gottier
BY
ATTORNEY Patented Mar. 18, 1947

2,417,549

UNITED STATES PATENT OFFICE 2,417,549

FIRE CONTROL COMPUTER

Thomas L. Gottier, Princeton, N. J., assignor to Radio Corporation of America, a corporation of Delaware Application January 29, 1944, Serial No. 520,375

6 Claims. (Cl. 161—15)

This invention relates to fire control computers, and has for its principal object the provision of an improved apparatus and method of operation whereby the "dead time" in gunnery is made continuously available to the operator of a fire control computer.

The expression "dead time" is commonly used to indicate the time interval between the removal of a shell from a fuse setter and the firing of the shell. It is frequently desirable that this time be known to the computer operator both as a measure of the dead time of the last shell fired and as a measure of the average dead time of the last several shells fired. The present invention provides a time measuring system whereby this data is continuously indicated as successive shells are removed from the fuse setter and fired.

The time measuring system of the present invention is in the form of an adjunct easily applicable to a fire control computer. It includes a multicontact switch having one set of contacts connected to a slip ring, or the like, through different capacitors and a pair of contacts. All of the contacts are rotatable together. Of the pair of rotatable contacts, one is connected through a resistor to a battery for starting charging of one of the capacitors in response to removal of the shell from the fuse setter and the other is arranged to discharge the capacitor to be charged during the dead time of the next shell fired.

Rotation of the contacts is effected by means of a pawl and ratchet which is energized in response to operation of a firing pin. Operation of this pin to fire the shell also functions to disconnect from the charging battery the capacitor charged through the resistor during the dead time of the last fired shell and to advance the rotatable contacts one step so that the system is in condition to measure the dead time of the next fired shell when the firing pin has returned to its normal position. Under these conditions, one of the capacitors is discharged and the charge of the remaining capacitors is a measure of the average dead time of the last several shells (four in the present case) fired.

The present system also includes two meters for measuring respectively the dead time of the last shell fired and the average dead time of the previous four shells fired.

The operation of the system is based on the well known fact that, if the time constant CR of the circuit formed by one of the capacitors and the resistor through which it is charged is large compared to that of the dead time of the shell, the meters to which they are connected may be calibrated in terms of time. Since one of the meters is connected to the capacitor charged during the dead time of the last fired shell and the other capacitors are connected to capacitors each charged during the firing of a previously fired shell, the operator always has these dead times available to assist him in the operation of the computer.

The invention will be better understood from the following description considered in connection with the accompanying drawing and its scope is indicated by the appended claims.

The single figure of the drawing is a wiring diagram of a time measuring system arranged in accordance with the invention.

This system includes a multicontact switch having rotatable contacts 10 to 15 and fixed contacts 16 to 20. The rotatable contacts 12 to 15 are mounted on a slip ring 20' which is secured to an insulation member 17'. The insulation member is fixed to a shaft 18' on which is mounted a star wheel S and the engaging pawl 43.

The fixed contacts 16, 17, 18, 19 and 20 are connected respectively through similar capacitors 21, 22, 23, 24 and 25 to a connecting ring 26. A brush or contact 11 rotating with a second slip ring 11' is provided for discharging each of the capacitors prior to its being charged through the brush contact BC. A second brush 28 riding on the slip ring 20' is connected through a meter 29 to the connecting ring 26. A meter 30 is connected between the connecting ring 26 and the rotatable contact 10 through a connection 31.

The fire control elements of the system include a fuse setter 32 and a firing pin 31'.

When the fuse setter 32 contains a shell 33, as illustrated, a switch 34 is open and when the shell is removed this switch is closed thereby energizing a solenoid 35 which closes a switch 36—37 and connects a battery 38 to the capacitor 21 through a resistor 39 and the rotatable contact 10.

When the shell 33 is fired, the firing pin 31' moves to the left thus connecting solenoids 40 and 41 to a battery 42. The solenoid 40 functions to open the switch 36—37 and interrupt charging of the capacitor 21 from the battery 38. The solenoid 41 operates through a ratchet 43 to rotate the contacts 10 to 15 one step so as to discharge the capacitor 22 and bring the contact 10 into engagement with the contact 17, the contact 12 into engagement with the contact 18, etc.

With the return of the firing pin to its illustrated position, the system is now in condition to measure the time between the placing of a shell in the fuse setter and the firing of the shell.

As previously explained, the meter 30 indicates the dead time (the time between removal of the shell from the fuse setter and firing of the shell) of the last shell fired and, since the capacities of 21, 22, 23, 24 and 25 are equal, the meter 29 indicates the average dead time of the last four shells fired. It is apparent that the provision of additional capacitors makes it possible to register on the meter 29 the average dead time of any desired number of fired shells.

The present system is used advantageously in connection with fire control computers where the meters are so mounted as to be visible to the operator of the computer.

I claim as my invention:

1. The combination of a fuse setter including a switch which is closed in response to removal of a shell therefrom, a firing pin, and means responsive to closure of said switch and operation of said firing pin for measuring the dead time of said shell.

2. The combination of a fuse setter including a switch which is closed in response to removal of a shell therefrom, a firing pin, and means including a resistance-capacity circuit energized in response to closure of said switch and deenergized in response to operation of said firing pin for measuring the dead time of said shell.

3. The combination of a fuse setter including a switch which is closed in response to removal of a shell therefrom, a firing pin, means responsive to closure of said switch and operation of said firing pin for measuring the dead time of said shell, and means for measuring the average dead time of a plurality of previously fired shells.

4. The combination of a fuse setter including a switch which is closed in response to removal of a shell therefrom, a firing pin, means responsive to closure of said switch and operation of said firing pin for measuring the dead time of said shell, and a plurality of capacitors arranged to be connected in parallel for measuring the dead time of previously fired shells.

5. The combination of a pair of switches, a plurality of capacitors, a resistor, a source of voltage, means operable in response to closure of one of said switches for connecting one of said capacitors to said source through said resistor, and means operable in response to the other of said switches for interrupting said connection, instantaneously short-circuiting another of said capacitors and connecting said resistor to said other capacitor.

6. The combination of a pair of switches, a plurality of capacitors, a resistor, a source of voltage, means operable in response to closure of one of said switches for connecting one of said capacitors to said source through said resistor, means operable in response to the other of said switches for interrupting said connection, instantaneously short-circuiting another of said capacitors and connecting said resistor to said other capacitor, and means for connecting all of said capacitors except said other capacitor in parallel simultaneously with the connection of said resistor to said other capacitor.

THOMAS L. GOTTIER.